Feb. 15, 1927. 1,617,857

H. C. MALLORY

METHOD OF PRODUCING EXPANSIBLE COLLAPSIBLE ELEMENTS

Filed Aug. 31, 1920

Inventor
Harry C. Mallory
By Conrad A. Dutcher
his Attorney

Patented Feb. 15, 1927.

1,617,857

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS A CORPORATION OF NEW JERSEY.

METHOD OF PRODUCING EXPANSIBLE COLLAPSIBLE ELEMENTS.

Application filed August 31, 1920. Serial No. 407,206.

My invention relates to elastic elements, and the same has for its object more particularly to provide an elastic metallic element for use in connection with apparatus or devices subject to or influenced by temperature or pressure variations, whereby to operate a valve, apparatus or other mechanism.

Further, said invention has for its object to provide an expansible-collapsible element for purposes such as above indicated, which is so reinforced as to facilitate the attaching or securing of other parts or devices thereto.

Further, said invention has for its object to provide an expansible-collapsible element of the character specified having one end interiorly reinforced whereby to give greater strength and rigidity to said end, and to facilitate the attaching or securing of other parts or devices thereto.

Further, said invention has for its object to provide a cylindrical, corrugated expansible-collapsible element having an open end and a closed end, and a rigid disk permanently secured within said element at its closed end whereby to interiorly reinforce said end, and which also may serve as a valve face, and to facilitate the attaching or securing of other parts or devices thereto.

Further, said invention has for its object to provide a simple, convenient and inexpensive method of producing an expansible-collapsible element of the character herein above specified.

Other objects will in part be obvious, and in part be pointed out hereinafter.

To the attainment of the aforesaid objects and ends my invention consists in the several steps constituting the method hereinafter more fully described, and then pointed out in the claims.

In the accompanying drawings forming part of this specification, wherein like numerals of reference indicate like parts,—
Figure 1 is a central vertical section showing one form of shell used in making an expansible-collapsible element embodying my said invention; the wall and closed end of said shell being of uniform thickness;

Figure 1:
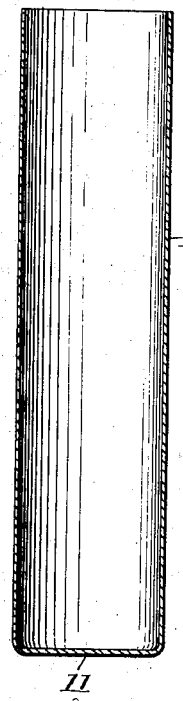
Figure 2:
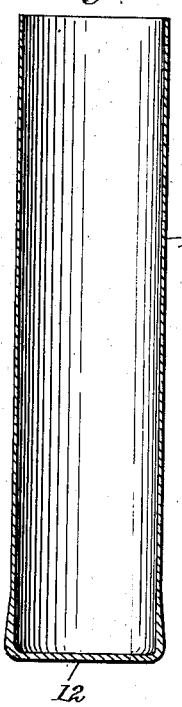
Fig. 2 is a similar view showing a shell having its closed end, and the portions of the side wall adjoining said closed end of greater thickness than the remainder of the shell.
Figure 3:
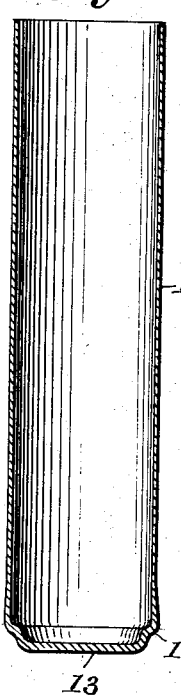
Fig. 3 is a similar view showing the closed end of the shell with a boss formed thereon.
Figure 4:
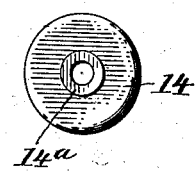
Figs. 4 and 5 are respectively face and edge views illustrating one form of reinforcing member.
Figure 5:
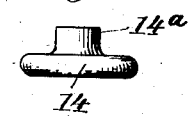

In producing an expansible-collapsible element I first form a cylindrical metal blank 10, having a closed end 11 as shown either at Fig. 1 or Fig. 2, in the latter of which the closed end is of greater thickness, as shown at 12, than the remainder or body portion of said blank.

Figure 6:
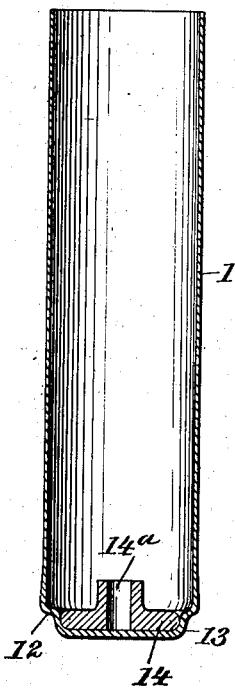
Fig. 6 is a central vertical section of a shell with a reinforcing member inserted within the reduced portion or boss projecting from the closed end of the shell.
Figure 7:
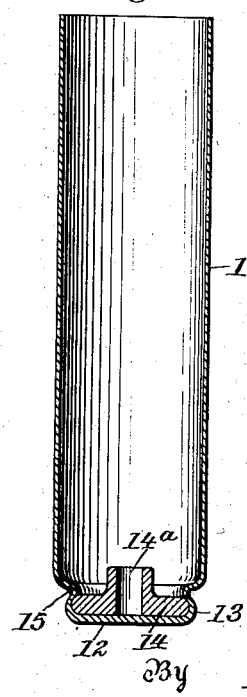
Fig. 7 is a similar view showing the reinforcing member secured within said closed end.
Figure 8:
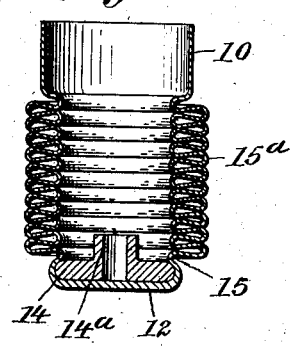
Fig. 8 is a central vertical section showing a completed expansible-collapsible element.

Next I subject the closed end of the blank to the action of a suitable set of dies and form a boss 13 extending outwardly from said closed end 11, and then insert into said boss 13, from the inside of the shell 10, a metal reinforcing member 14 of the desired shape but of slightly smaller outline or contour than the interior diameter of the boss 13, as shown at Fig. 6. The member 14 is herein shown in the form of a circular disk having its edges rounded and provided upon its upper surface with a centrally disposed boss 14ª.

Hereupon the closed end of the shell with the disk 14, in position within the boss 13, is subjected to the action of a suitable set of dies, and an annular groove 15 formed in the shell 10 at the junction of the side wall of the shell with the side wall of the boss 13.

The annular groove 15 should be of such depth that its inner edge will extend sufficiently inwardly over the edge of the disk 14 to engage and firmly hold said disk 14 rigidly in position within the boss 13.

The shell 10 is finally secured in a suitable revoluble support by clamping or otherwise fastening the reinforced boss 13 within a chuck or clamp, and then subjecting the thinner or body portion of the shell to the action of suitable dies and transversely corrugating the same to form a series of parallel corrugations or folds 15ª. A convenient method of corrugating the shell is shown in my pending application, Serial No. 368,116 filed March 23, 1920, and patented August 24, 1926, No. 1,597,206.

In constructing the expansible-collapsible element, the body portion may be circumferentially corrugated as one of the first or earlier operations, or as the last or one of the later operations as may be found more convenient or desirable.

This application is a continuation in part of my earlier application, Serial No. 833,593, filed April 22, 1914, renewed December 5, 1919, Serial No. 342,802, and patented January 25, 1921, No. 1,366,473.

In this case no claim is made for the product resulting from the process herein described and claimed, as said product constitutes the subject-matter of a divisional application, filed July 25, 1925, Ser. No. 46,102.

Having thus described my said invention what I claim and desire to secure by Letters Patent is:

1. The process of making an expansible-collapsible element which consists in forming from a metal blank a shell having a closed end, inserting a reinforcing member into said closed end, bringing a portion of the wall of said shell into engagement with said reinforcing member to secure said member in place within said closed end, and circumferentially corrugating the body portion of said shell, substantially as specified.

2. The process of making an expansible-collapsible element which consists in forming from a metal blank a shell having a closed end, inserting a flat, inelastic reinforcing member into said closed end, bringing a portion of the wall of said shell into engagement with said reinforcing member to secure said member in place within said closed end, and circumferentially corrugating the body portion of said shell, substantially as specified.

3. The process of making an expansible-collapsible element which consists in forming from a metal blank a shell having a closed end, inserting into said closed end a member conforming substantially thereto, reducing the diameter of said shell adjacent to said member whereby to secure the same in place within said shell, and circumferentially corrugating the body portion of said shell, substantially as specified.

4. The process of making an expansible-collapsible element which consists in forming from a metal blank a shell having a closed end, inserting into said closed end a flat, circular member conforming substantially to the interior thereof, reducing the diameter of said shell adjacent to said member whereby to secure the same in place within said shell, and circumferentially corrugating the body portion of said shell, substantially as specified.

5. The process of making an expansible-collapsible element which consists in forming from a metal blank a cylindrical shell having a closed end, forming a boss extending outwardly from said closed end, inserting a flat reinforcing member into said boss, reducing the diameter of said boss above said reinforcing member to secure said reinforcing member in place therein, and circumferentially corrugating the body portion of said shell, substantially as specified.

6. The process of making an expansible-collapsible element which consists in forming from a metal blank a cylindrical shell having a closed end, forming a boss extending outwardly from said closed end, inserting into said boss a flat reinforcing member corresponding in outline with the interior contour of said boss, conforming the side of said boss to said reinforcing member to secure said reinforcing member in place therein, and circumferentially corrugating the body portion of said shell, substantially as specified.

7. The process of making an expansible-collapsible element which consists in forming from a metal blank a cylindrical shell having a closed end, forming a reduced boss extending from said closed end, inserting a flat circular reinforcing disk into said boss, crimping the adjacent shell wall into engagement with the edge of said disk, and circumferentially corrugating the body portion of said shell, substantially as specified.

8. The process of making an expansible-collapsible element which consists in forming from a metal blank a thin shell having a closed end with a relatively thickened wall portion, inserting a reinforcing member into said closed end, bringing a portion of the wall of said shell adjacent to said thickened portion into engagement with said member to secure the same in place within said closed end, and circumferentially corrugating the relatively thinner body portion of said shell beyond said reinforced end to render the element elastic, substantially as specified.

9. The process of making an expansible-collapsible element which consists in forming from a metal blank a thin shell having a closed end with a relatively thickened wall portion, forming a reduced boss extending from said closed end, inserting into said boss a member conforming substantially to the interior thereof, crimping the shell wall adjacent to said thickened wall portion over said member to secure the same within said boss, and circumferentially corrugating the relatively thinner body portion of said shell beyond said crimped portion to render the element elastic, substantially as specified.

Signed at the city of New York, New York County, in the State of New York, this first day of June, one thousand nine hundred and twenty.

HARRY C. MALLORY.